Figure 1:
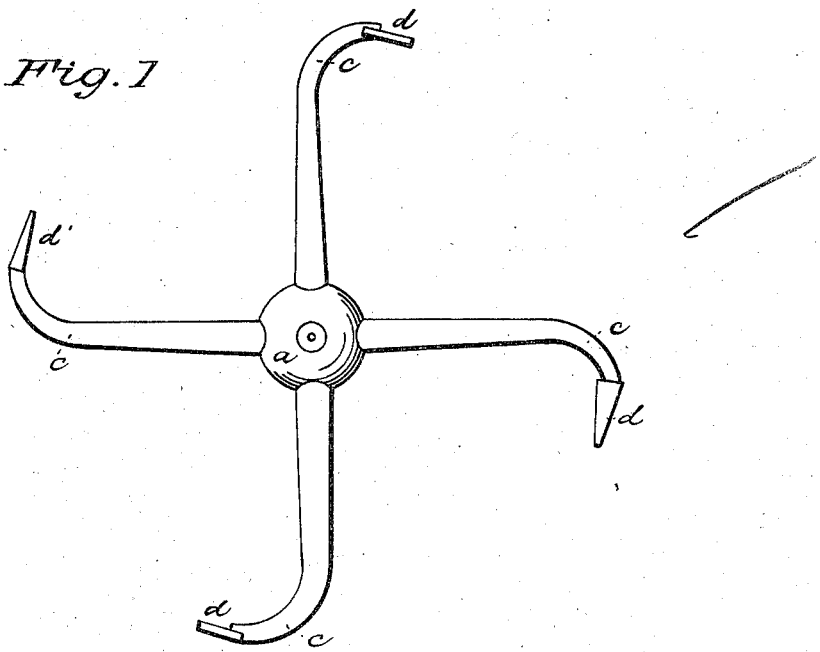
Figure 2:
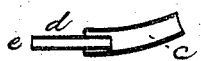

W. L. JUKES.
Gas Burner.

No. 97,517.                                         Patented Dec. 7, 1869.

Witnesses
William A. Abbott.
F. F. Cornell

Inventor
Wesley L. Jukes

United States Patent Office.

WESLEY L. JUKES, OF NEW YORK, N. Y., ASSIGNOR TO HIMSELF, FREDERICK McLEWEE, PRENTICE H. PUTNAM, AND BRONSON MURRAY, OF SAME PLACE.

Letters Patent No. 97,517, dated December 7, 1869.

GAS-BURNER.

The Schedule referred to in these Letters Patent and making part of the same.

*To all whom it may concern:*

Be it known that I, WESLEY L. JUKES, of the city, county, and State of New York, have invented a new and useful Improvement in Gas-Burners.

The object of my invention is to provide the glass arms of a revolving gas-burner with orifices which will not fuse at the temperature required to melt glass, for the escape of the gas, and to remove the heat of the burning gas so far as may be necessary to secure the glass from injury therefrom, and thereby further improve an invention for which Letters Patent were issued upon my petition, and which are dated August 3, 1869.

I do hereby declare that the following is a full and exact description thereof, reference being had to the accompanying drawings, in which—

Figure I is a plan of my invention, and

Figure II is a section, taken through the axis of an arm of a gas-burner to which my improvement is applied.

Like letters in each of the figures designate like parts.

To enable others skilled in the art to make and use my invention, I will proceed to describe its construction and operation.

The tube $a$ supplies the gas to each of the arms $c\ c\ c\ c$, and at the outer and curved ends of said arms I apply my present invention, which consists of a thin metallic tube, $d$, about one-half of an inch in length, and with a bore sufficient to carry the amount of gas to be burned. The one end of the tube $d$ may be secured to the glass arm $c$ by embedding it when the glass is plastic from heating it, care being taken to secure a continuous passage for the gas from the glass to the metallic tube. The tube, as shown at $d'$, may, however, be swelled at one end to receive the end of the arm $c$, and it may be attached to the said arm externally or internally, with like effect to the object of my invention, and secured by cement, or any mechanical device.

In operating my invention, the gas is allowed to flow through the tubes $a$ and $c$ into the tube $d$, and is burned at the orifice $e$, Fig. II, thereby removing the heat of its combustion a sufficient distance from the glass arm to render it safe to use very thin glass in the tubes of the burner, and thereby lessen the weight of the burners, which is a very great advantage.

In place of the metallic tube or tip $d\ d'$, a tube or tip of clay, stone, or any other material which will not fuse at a temperature required to fuse glass, or which would be generated by the burning of illuminating-gas, may be used with like advantage and effect, and may be attached in like manner with the metallic tube, either internally, as at $d$, or externally as at $d'$.

What I claim as my invention, and desire to secure by Letters Patent, is—

1. The use of the tube $d\ d'$, when composed of any material which will not fuse at the temperature required to fuse glass, in combination with the glass arms $c$, as and for the purposes described.

2. Embedding the inner ends of the tubes or tips $d$, in the glass arms $c$, or surrounding the ends of the glass arms $c$ with the ends of the tubes or tips $d'$, to form secure and gas-tight joints, as and for the purposes described.

Dated October 8, 1869.

WESLEY L. JUKES.

Witnesses:
WILLIAM A. ABBOTT,
FREDERICK F. CORNELL, Jr.